United States Patent [19]

Klapka

[11] Patent Number: 5,915,007
[45] Date of Patent: Jun. 22, 1999

[54] METHOD AND SYSTEM FOR USING A FREQUENT SHOPPER CARD AS A PHONE CALLING CARD

[75] Inventor: Timothy J. Klapka, Tampa, Fla.

[73] Assignee: Catalina Marketing International, Inc., St Petersburg, Fla.

[21] Appl. No.: 09/059,371

[22] Filed: Apr. 14, 1998

[51] Int. Cl.$^6$ ............... H04M 15/00; H04M 17/00; G06P 17/00; G06K 5/00
[52] U.S. Cl. ............... 379/144; 379/114; 379/91.02; 705/14; 705/18; 235/382
[58] Field of Search ............... 379/91.01, 91.02, 379/114, 115, 121, 130, 140, 144; 705/14, 16, 17, 18, 21; 235/380, 381, 382

[56] References Cited

U.S. PATENT DOCUMENTS

| | | | |
|---|---|---|---|
| 5,056,019 | 10/1991 | Schultz et al. | 705/14 |
| 5,504,808 | 4/1996 | Hamrick, Jr. | 379/114 |
| 5,608,785 | 3/1997 | Kasday | 379/91.01 |
| 5,629,977 | 5/1997 | Fonseca | 235/380 |
| 5,673,309 | 9/1997 | Woynoski et al. | 379/144 |
| 5,729,693 | 3/1998 | Holda-Fleck | 705/14 |

*Primary Examiner*—Paul Loomis
*Attorney, Agent, or Firm*—Oblon, Spvak, McClelland, Maier & Neustadt, P.C.

[57] ABSTRACT

A method and system for using a frequent shopper card as a phone calling card including (a) issuing a transfer certificate with a predetermined phone time and having a first personal identification number, at a terminal; and (b) adding the predetermined phone time to an account, associated with the frequent shopper card having a second personal identification number, based on the first personal identification number, at a server. The server includes a memory containing a data structure for storing information relating to using the frequent shopper card as a phone calling card. The memory includes fields which store the account information associated with the frequent shopper card, and fields which store the first and second personal identification numbers. A computer program product includes a computer storage medium having a computer program code mechanism embedded in the computer storage medium for causing a computer to allow the frequent shopper card to be used as a phone calling card. The computer program code mechanism includes a first code device configured to issue the transfer certificate with the predetermined phone time, at the terminal; and a second code device configured to add the predetermined phone time to the account, at the server.

16 Claims, 7 Drawing Sheets

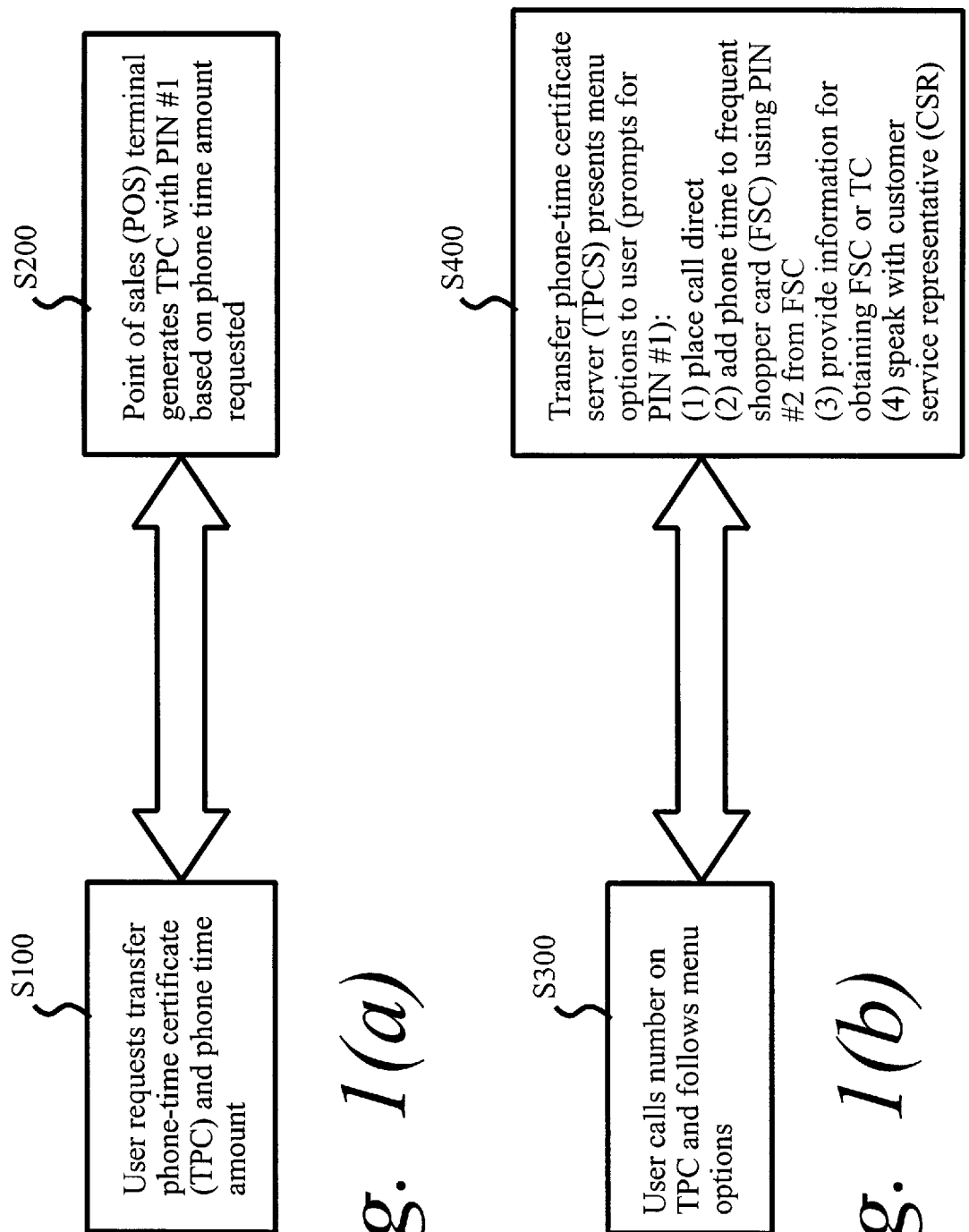

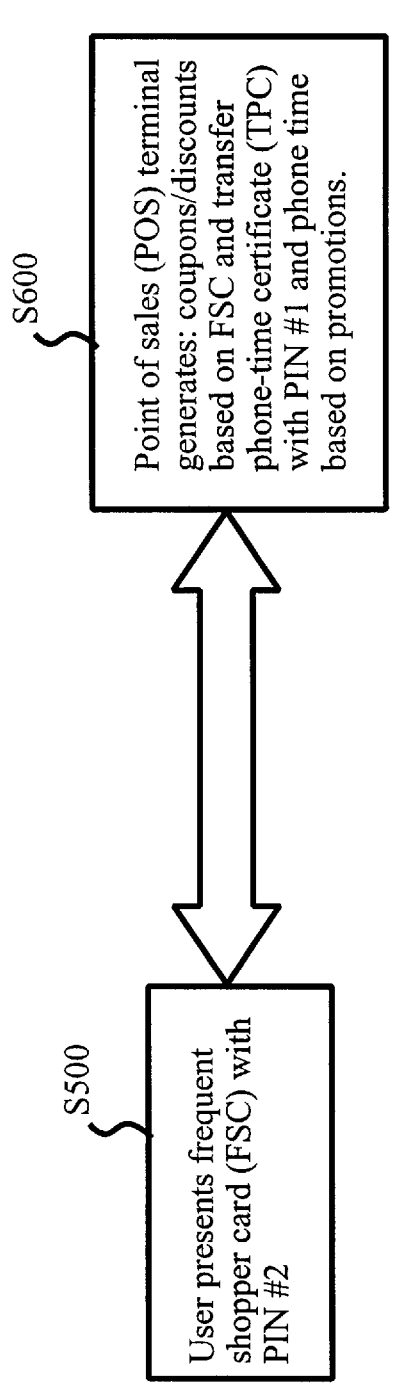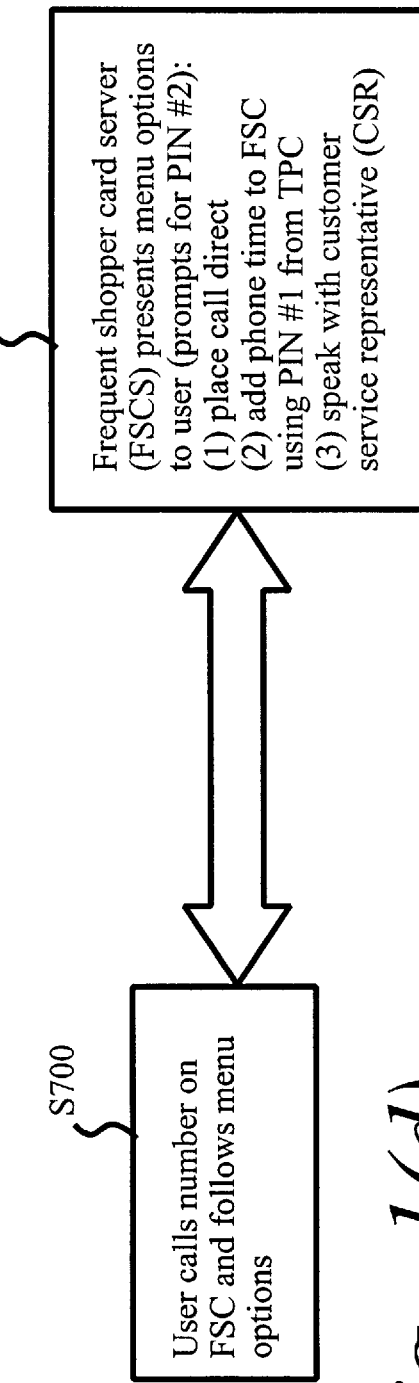
Fig. 1(c)
Fig. 1(d)

(a)

(b)

METHOD AND SYSTEM FOR USING A FREQUENT SHOPPER CARD AS A PHONE CALLING CARD

CROSS REFERENCES TO RELATED APPLICATIONS

The present invention is related to commonly owned U.S. Pat. Nos. 4,723,212; 4,910,672; 5,173,851; and 5,612,868 and U.S. patent application Ser. No. 08/663,680, filed on Jun. 14, 1996, all of which are incorporated herein by reference.

BACKGROUND OF THE INVENTION

1. Field of the Invention

This invention relates generally to frequent shopper and phone cards and, more specifically, to a system and method for using a frequent shopper card as a phone calling card, and more particularly, to a system and method for transferring, in real time, phone time to a frequent shopper card having an account associated therewith.

2. Discussion of Background

In recent years, various methods and systems have been developed for the distribution and use of frequent shopper cards and phone calling certificates. A frequent shopper card may be in the form of an account encoded on a plastic card which triggers coupons/discounts to a card holder when presented at a point-of-sale (POS) terminal of a retail store. A phone calling certificate enables a shopper to purchase pre-paid phone time, for example, as taught in U.S. patent application Ser. No. 08/663,680. The phone calling certificate may be generated at a POS terminal in real time in the form of a printed slip bearing a personal identification number (PIN) and phone calling instructions. U.S. patent application Ser. No. 08/663,680, describes a system and method for generating self-authenticating PIN numbers on, for example, paper phone calling certificates printed at a POS terminal. The generation of the PIN is accomplished in real time, advantageously, deterring fraud, theft, and misuse, etc. of the phone calling certificates.

However, when the PINs used to obtain phone time are printed on paper, the paper may be easily damaged or destroyed.

SUMMARY OF THE INVENTION

Accordingly, one object of this invention is to provide a novel method and system for using a frequent shopper card as a phone calling card.

Another object of the present invention to provide a novel method and system for converting a frequent shopper card into a phone calling card with minimal modification to existing phone calling card and frequent shopper card distribution systems.

The above and other objects are achieved according to the present invention by providing a new and improved method and system for using a frequent shopper card as a phone calling card including (a) issuing a transfer certificate with a predetermined phone time and having a first personal identification number, at a terminal; and (b) adding the predetermined phone time to an account, associated with the frequent shopper card having a second personal identification number, based on the first personal identification number, at a server. The server includes a memory containing a data structure for storing information relating to using the frequent shopper card as a phone calling card. The memory includes fields which store the account information associated with the frequent shopper card, and fields which store the first and second personal identification numbers. A computer program product includes a computer storage medium having a computer program code mechanism embedded in the computer storage medium for causing a computer to allow the frequent shopper card to be used as a phone calling card. The computer program code mechanism includes a first code device configured to issue the transfer certificate with the predetermined phone time, at the terminal; and a second code device configured to add the predetermined phone time to the account, at the server.

Other aspects and advantages of the invention will become apparent from the more detailed description that follows, taken in conjunction with the drawings, which are briefly described below.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIGS. 1a–1d are top level flowcharts of the method of transferring phone time from a transfer phone-time certificate to a frequent shopper card according to the present invention;

DESCRIPTION OF THE PREFERRED EMBODIMENTS

Figure 2:
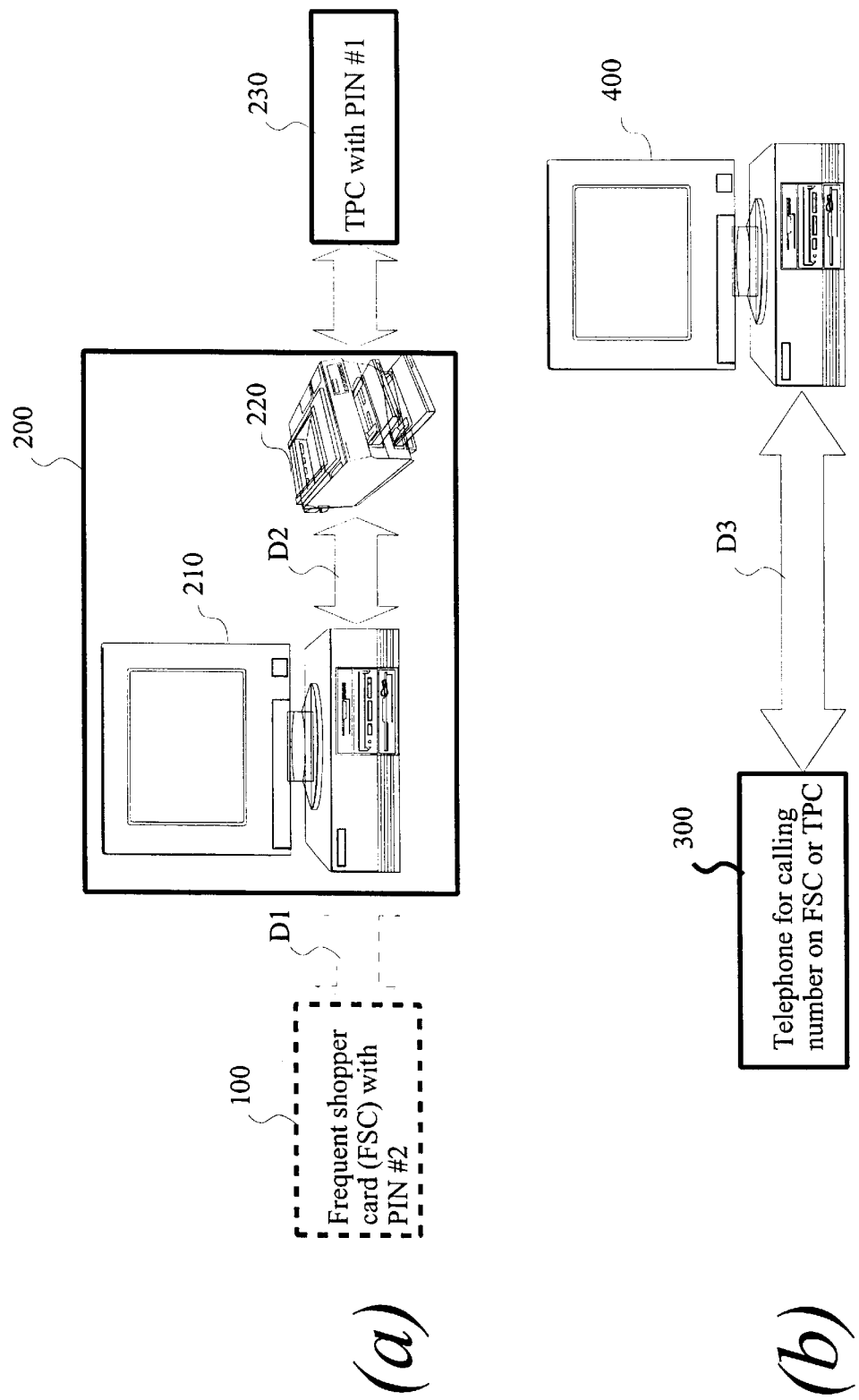
FIGS. 2a–2b are top level block diagrams of the system for transferring phone time from a transfer phone-time certificate to a frequent shopper card according to the present invention.

Referring now to the drawings, wherein like reference numerals designate identical or corresponding parts throughout the several views, and more particularly to FIGS. 1a–1d thereof, there are illustrated top level flowcharts of the method of transferring phone time from a transfer phone-time certificate to a frequent shopper card according to the present invention.

In FIG. 1a, at step S100, a user requests a transfer phone-time certificate (TPC) with and a predetermined phone time amount (e.g., 15, 30, or 60 minutes). At step S200, a point-of-sale (POS) terminal generates the transfer phone-time certificate with a first PIN (PIN #1) based on the phone time amount requested by the user. The PIN number on the transfer phone-time certificate may be generated, for example, as taught in pending U.S. patent application Ser. No. 08/663,680.

In FIG. 1b, at step S300, the user calls, for example, a 1-800 number imprinted on the transfer phone-time certificate and when prompted follows menu options which require the PIN #1 and/or a PIN #2 from a frequent shopper card. At step S400, a transfer phone-time certificate server (TPCS) presents menu options to the user after prompting the user for the PIN #1. These menu options, for example, include: (1) allowing the user to place a direct call; (2) adding phone time to the frequent shopper card using PIN #2 from the frequent shopper card; (3) providing information for obtaining a frequent shopper card or a transfer phone-time certificate; and (4) allowing the customer to speak with a customer service representative (CSR). It is noted the user could call a 1-800 number imprinted on the frequent shopper card, in which case steps S700 and S800 of FIG. 1d, as will be later described, would take place.

The above-described method shown in FIGS. 1a and 1b is referred to a "pre-paid" environment since the user pre-pays for the transfer phone-time certificate at the point-of-sale (POS) terminal. In a typical "pre-paid" transaction, the customer tells the cashier which card type they would like (e.g., 15 minute, 30 minute or 60 minute, etc.), the cashier keys corresponding price look-up (PLU) code or scans 15 minute, 30 minute or 60 minute scan card, and the point-of-sale terminal prints a transfer phone-time certificate. The cashier hands the customer the transfer phone-time certificate and the certificate can be transferred to the frequent shopper card or used immediately since transfer phone-time certificates are activated as they are printed (see, e.g., pending patent application Ser. No. 08/663,680).

The method of the present invention in a "promotional" environment will now be described with reference to FIGS. 1c and 1d.

In FIG. 1c, at step S500, a user presents a frequent shopper card (FSC) having a PIN #2. U.S. Ser. No. 08/663,680. At step S600, a point-of-sale (POS) terminal generates a transfer phone-time certificate with a phone time amount (e.g., 15, 30, or 60 minutes) having a PIN #1 and/or coupons/discounts based on in-store promotions. The PIN #1 and the PIN #2 may be generated, for example, as taught in pending U.S. patent application Ser. No. 08/663,680.

In FIG. 1d, at step S700, the user calls, for example, a 1-800 number imprinted on the frequent shopper card and when prompted follows menu options which require the PIN #2 and/or a PIN #1 from the transfer phone-time certificate. At step S800, a frequent shopper card server (FSCS) presents menu options to the user after prompting the user for the PIN #2. These menu options, for example, include: (1) allowing the user to place a direct call; (2) adding phone time to the frequent shopper card using PIN #1 from the transfer phone-time certificate; and (3) allowing the customer to speak with a customer service representative (CSR). It is noted the user could call a 1-800 number imprinted on the transfer phone-time certificate in which case steps S300 and S400 of FIG. 1b would take place.

FIG. 2a illustrates the system of the present invention in the pre-paid and promotional environments as previously discussed. In the pre-paid environment the user requests the transfer phone-time certificate 230 at the point-of-sale terminal 200. The point-of-sale terminal 200 includes the point-of-sale computer 210 coupled to a printing device 220 via a data path D2. The point-of-sale terminal 200 issues and prints the transfer phone-time certificate 230 which is encoded with a first PIN (PIN #1) based on a requested phone time amount as previously discussed with reference to FIGS. 1a and 1b.

In the promotional environment, a frequent shopper card 100 having a second PIN (PIN #2) encoded thereon is transmitted to the point-of-sale terminal 200 via a data path D1. The data path D1 may include, for example, a magnetic card reader, an optical reading device, in-store scanner, etc. The point-of-sale terminal 200 issues and prints the transfer phone-time certificate 230 with a phone time amount (e.g., 15, 30, or 60 minutes) having the PIN #1 and/or coupons/discounts based on in-store promotions as previously discussed with reference to FIGS. 1c and 1d.

In FIG. 2b, at a telephone 300, the user calls, for example, a 1-800 number printed on the frequent shopper card or the transfer phone-time certificate and connects over phone connection D3 to a frequent shopper card server (FSCS) or a transfer phone-time certificate server (TPCS) 400 which provides the user with menu options after prompting the user for the PIN #1 and/or PIN #1 as discussed with reference to FIGS. 1b and 1d. It is noted that the frequent shopper card server (FSCS) and the transfer phone-time certificate server (TPCS) 400 may be implemented as two separate computer systems or as one computer system. In addition, the user may connect to the frequent shopper card server and/or the transfer phone-time certificate server 400 over a modem connection, internet connection, network connection, etc., at which time the server 400 provides the user with on-screen menu options after the user is prompted for the PIN #1 and/or PIN #2.

Figure 3:
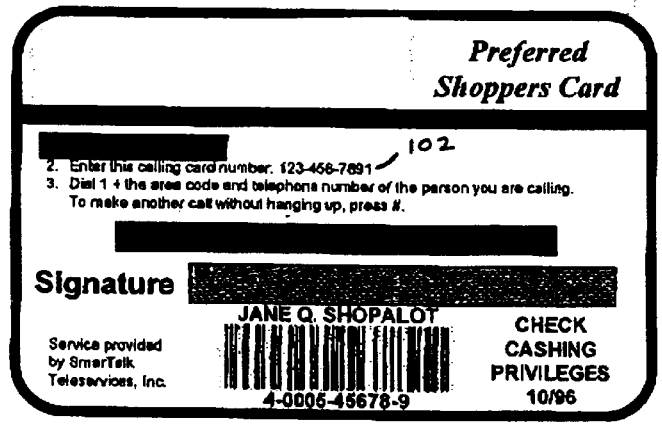
FIGS. 3a and 3b are respective images of a frequent shopper card and a transfer phone-time certificate used in the method and system according to the present invention.
Figure 3:
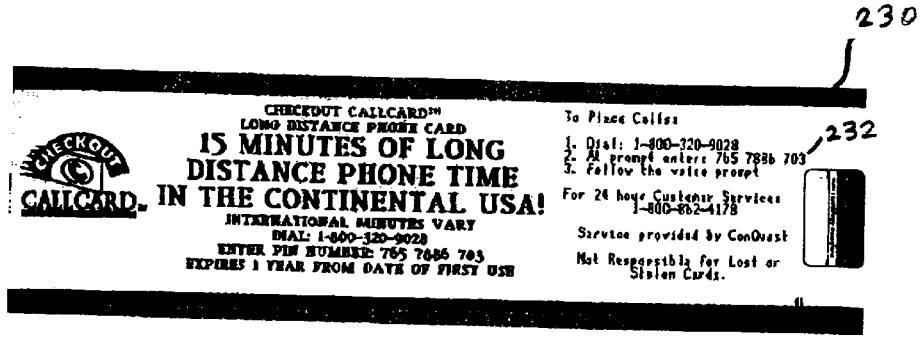

In FIG. 3a, there is illustrated a frequent shopper card 100 including a PIN 102 (PIN #2) and calling instructions. In FIG. 3b, there is illustrated a transfer phone-time certificate 230 including a PIN 232 (PIN #1) and calling instructions. As previously discussed, the PIN #1 and the PIN #2 may be generated, for example, as taught in pending U.S. patent application Ser. No. 08/663,680.

Figure 4:
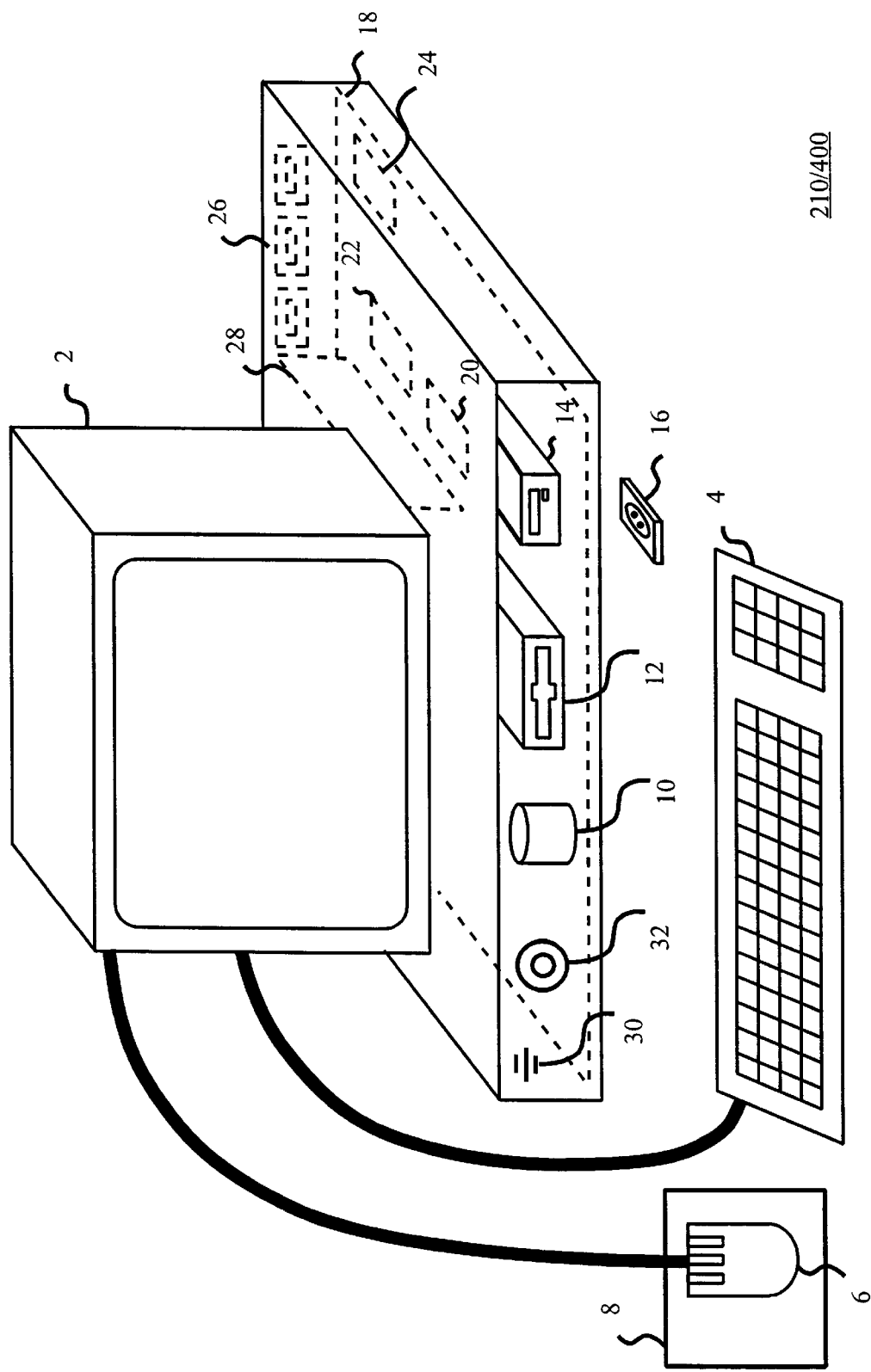
FIG. 4 is a detailed schematic diagram of a general purpose computer used in a point-of-sale terminal, and a frequent shopper card server or a transfer phone-time certificate server of FIGS. 2a and 2b according to the present invention.

FIG. 4 shows, for example, a detailed schematic diagram of the computer 210 of the point-of-sale terminal 200 and of the computer for the frequent shopper card server and/or the transfer phone-time certificate server 400 shown in FIG. 2b. The computer 210/400 may be a general purpose computer including a display 2, such as a conventional display device or a touch screen monitor with a touch-screen interface; a keyboard and/or numeric keypad 4; a pointing device or barcode reader 6; a mouse pad or a in-store scanner 8; a hard disk 10; a floppy drive or card reader 12; CD ROM or tape drive 14 with media 16; and a mother board 18. The mother board 18 includes a microprocessor 20; a random access memory (RAM) 22; a read-only memory (ROM) 24; I/O ports 26 for coupling to another computer, etc.; a specific hardware interface circuit 28 for performing specialized hardware/software functions, such as modem interfacing, serial-to-parallel and parallel to serial conversion, printer conflict mediation, sound processing, image processing, etc.; a microphone 30; and a speaker or speakers 32.

The computer programs for implementing steps S100–S800 of FIG. 1 can be stored, for example, in hard disk 10 or may be loaded via floppy drive 12 of the general purpose computer 210/400. In addition, data structures for storing information such as PINs, a total phone card calling time, user account information, etc., may be stored in RAM 22 and/or the hard disk 10 of the general purpose computer 210/400. It is noted that the PINs may be stored as PIN files in a non-sequential manner, for example, as taught in pending U.S. patent application Ser. No. 08/663,680.

Figure 5:
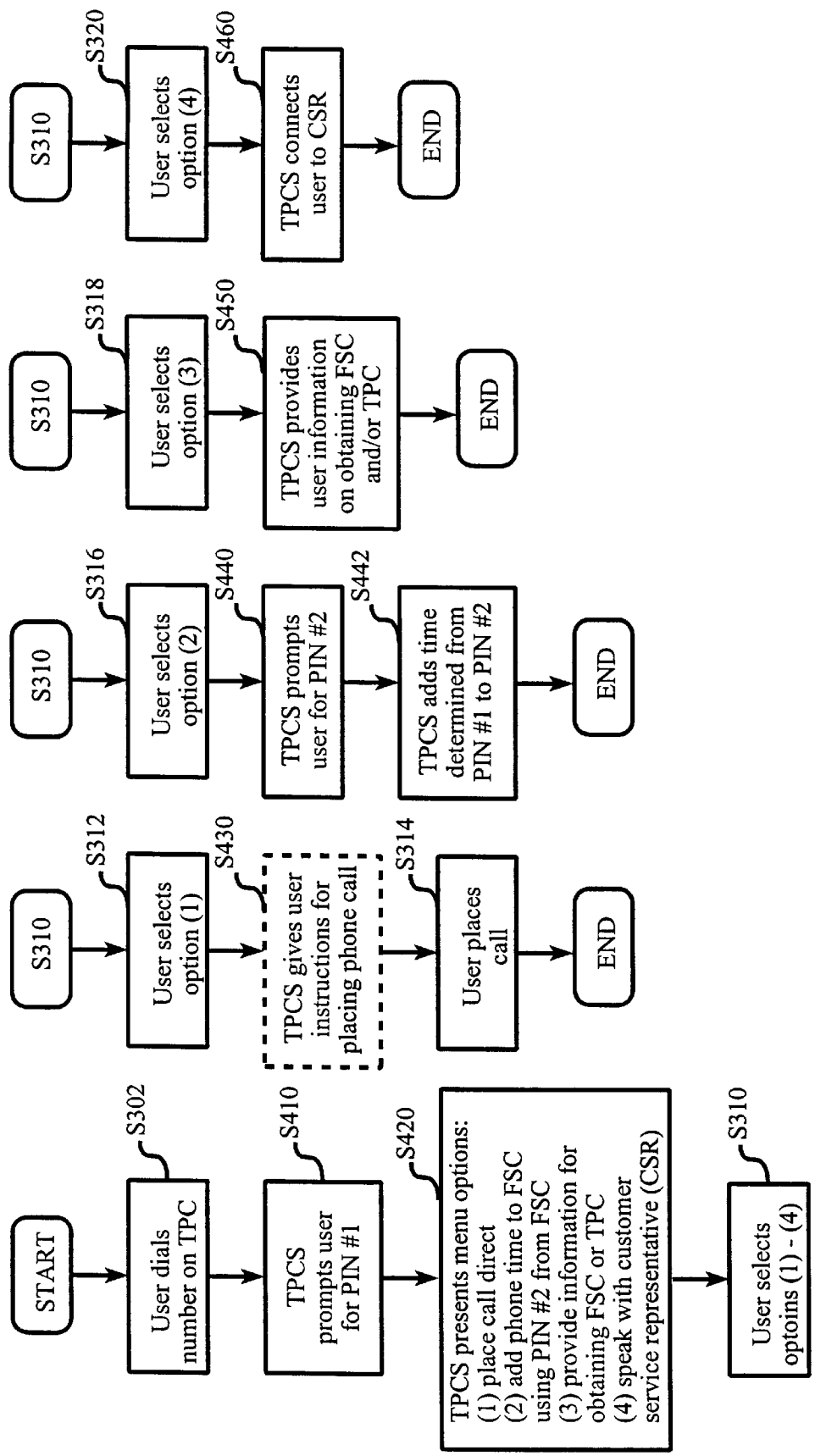
FIGS. 5 and 6 illustrate detailed flowcharts of the methods of FIGS. 1a–1d according to the present invention.

The details of the operation of the method of FIG. 1b according to the present invention will now be described with reference to FIG. 5. In FIG. 5, after the transfer phone-time certificate 230 has been issued at the point-of-sale terminal 200 as described with reference to FIGS. 1a, 1b, 2a and 2b, at step S302, the user dials a number printed on the transfer phone-time certificate and the transfer phone-time certificate server 400 prompts the user for the PIN #1 printed on the transfer phone-time certificate at step S410.

Once the user enters the PIN #1 from the transfer phone-time certificate, at step S420, the transfer phone-time certificate server presents the user with menu options, for example, including: (1) placing a direct call; (2) adding phone time to the frequent shopper card using PIN #2 from the frequent shopper card; (3) providing further information for obtaining a frequent shopper card or a transfer phone-time certificate; and (4) allowing the customer to speak with a customer service representative. At step S310, the user selects any one of the options (1)–(4) provided by the transfer phone-time certificate sever at step S420.

If the user selects option (1) at step S312, the transfer phone-time certificate server gives the user instructions for placing the phone call at step S430 and decrements the phone time in a user account corresponding to PIN #1 based on the length of the phone call. At step S314 the user places the call and the operation is completed. However, providing instructions at step S430 may be omitted and the user may place the call directly and the transfer phone-time certificate server decrements the phone time in the user account corresponding to PIN #1 based on the length of the phone call at step S410 as an optional method of performing this operation.

If the user selects option (2) at step S316, the transfer phone-time certificate server prompts the user for the PIN #2 at step S440. At step S442, the transfer phone-time certificate server adds phone time determined from the PIN #1 to a user account corresponding to the PIN #2 and this operation is completed. The phone time is determined from PIN #1 as shown, for example, in pending U.S. patent application Ser. No. 08/663,680. The transfer phone-time certificate server 400 may include a database stored on the hard disk 10 including information regarding the user account corresponding to PIN #2 and the current phone time for this account which is then incremented by the added phone time determined from the PIN #1.

If the user selects option (3) at step S318, the transfer phone-time certificate server provides the user information on obtaining a frequent shopper card and/or a transfer phone-time certificate at step S450 and this operation is completed.

If the user selects option (4) at step S320, the transfer phone-time certificate server connects the user to a customer service representative at step S460 and this operation is completed.

Figure 6:
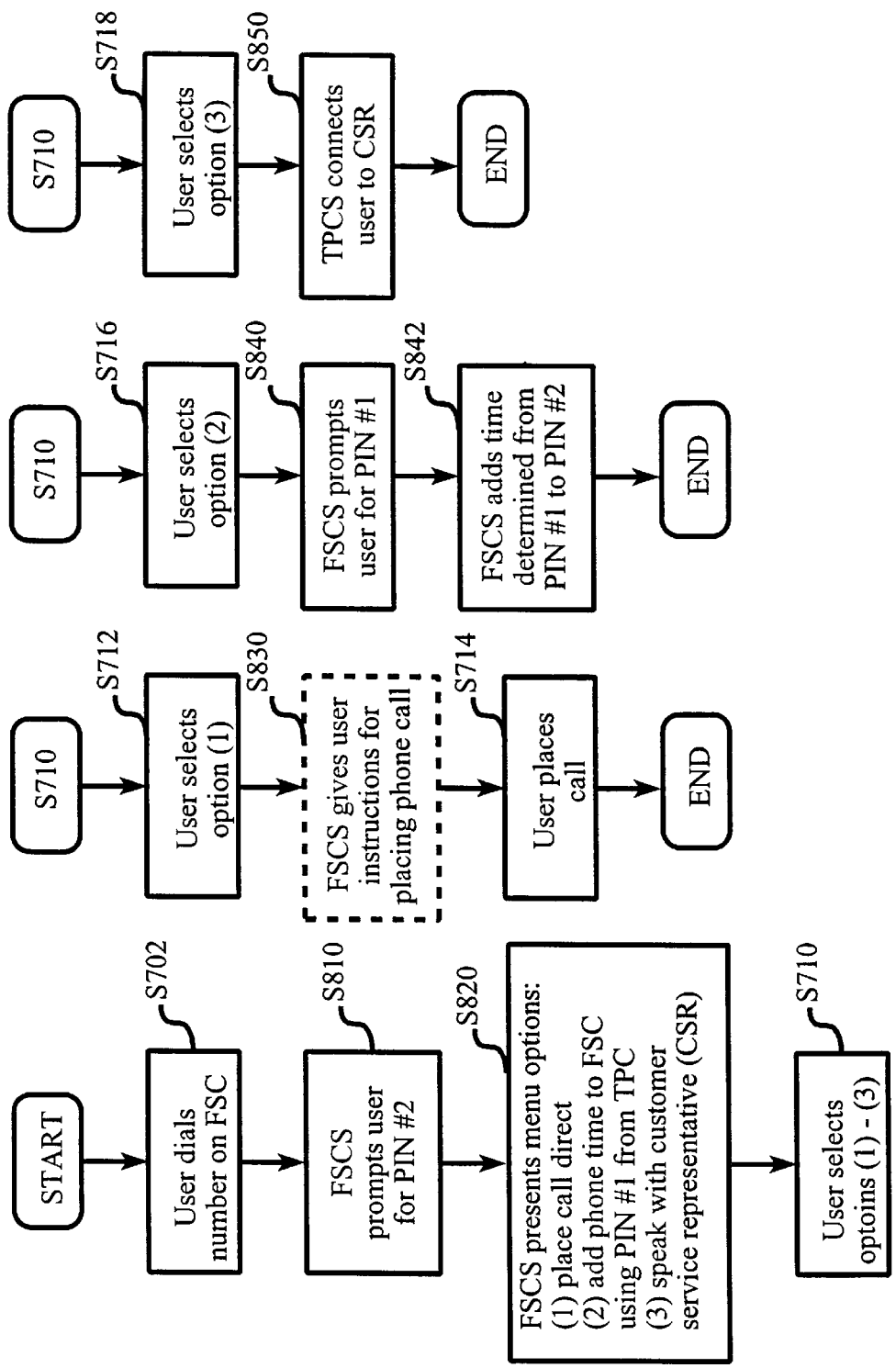

The details of the operation of the method of FIG. 1d according to the present invention will now be described with reference to FIG. 6. In FIG. 6, after the transfer phone-time certificate 230 has been issued at the point-of-sale terminal 200 as described with reference to FIGS. 1c, 1d, 2a and 2b, at step S702, the user dials a number printed on the frequent shopper card and the frequent shopper card server 400 prompts the user for the PIN #2 printed on the frequent shopper card at step S810. Once the user enters the PIN #2 from the frequent shopper card, at step S820, the frequent shopper card server presents the user with menu options, for example, including: (1) placing a direct call; (2) adding phone time to the frequent shopper card using PIN #1 from the transfer phone-time certificate; and (3) allowing the customer to speak with a customer service representative. At step S710, the user selects any one of the options (1)–(4) provided by the frequent shopper card sever at step S820.

If the user selects option (1) at step S712, the frequent shopper card server gives the user instructions for placing the phone call at step S830 and decrements the phone time in a user account corresponding to PIN #2 based on the length of the phone call. At step S714 the user places the call and the operation is completed. However, providing instructions at step S830 may be omitted and the user may place the call directly and the frequent shopper card server decrements the phone time in the user account corresponding to PIN #2 based on the length of the phone call at step S810 as an optional method of performing this operation.

If the user selects option (2) at step S716, the frequent shopper card server prompts the user for the PIN #1 at step S840. At step S842, the frequent shopper card server adds phone time determined from the PIN #1 to a user account corresponding to the PIN #2 and this operation is completed. The phone time is determined from PIN #1 as shown, for example, in pending U.S. patent application Ser. No. 08/663, 680. The frequent shopper card server 400 may include a database stored on the hard disk 10 including information regarding the user account corresponding to PIN #2 and the current phone time for this account which is then incremented by the added phone time determined from the PIN #1.

If the user selects option (3) at step S718, the frequent shopper card server connects the user to a customer service representative at step S850 and this operation is completed.

The method and system according to the present invention for using a frequent shopper card as a phone calling card adds more value to a frequent shopper card by converting it into a pre-paid phone card. In this way, consumers will be reminded of the savings that the frequent shopper card has to offer every time they use their frequent shopper card to place a phone call. According to the present invention, unique pre-paid debit calling card PIN (PIN #2) will be imprinted or hard coded on new frequent shopper cards or via a sticker distribution process, stickers having the unique pre-paid debit calling card PIN (PIN #2) may be placed on issued frequent shopper cards.

The sticker distribution process can be implemented for frequent shopper cards that are already distributed and/or for frequent shopper cards that are un-distributed. Bulk mailings to customers to include stickers for frequent shopper cards may be provided. In addition, increased customer information via advertising support and in store fliers may be implemented.

A process for transferring the phone time from the transfer phone-time certificate to the frequent shopper card is accomplished according to the present invention. Awareness of the transfer process may be implemented through menu options and through external advertising such as point-of-purchase material.

As previously discussed, the frequent shopper card contains a pre-paid debit calling PIN (PIN #2) with simple instructions for call activation and transferring phone time, and a customer service access 1-800 number. Similarly, detailed instructions may be provided on the transfer phone-time certificate for adding phone time to the frequent shopper card. Additionally, the process may be enhanced by issuing other external advertising vehicles such as frequent shopper card covers with easy to use instructions printed on them for using the frequent shopper card as a phone calling card. Also, informative check out coupon messages could be issued to customers to explain how shoppers can get phone time at the consumer store and how they can add phone time to their frequent shopper card. In addition, point-of-sale material could be redesigned to show how to charge phone time to the frequent shopper card.

Further, recharge information stickers having instructions on how to convert the frequent shopper card into a calling card could be placed on the back of new frequent shopper cards. As an incentive, the frequent shopper cards could be initially loaded with a predetermined amount of free phone time to entice users into using the frequent shopper card as a phone calling card.

Other ways to increase consumer awareness, in promotional environment, could be to provide free transfer phone-time certificates when a consumer buys certain products, convert a 20% temporary price reduction into free transfer phone-time certificates for frequent shopper card holders, and reward shoppers with free transfer phone-time certificates.

Some of the benefits of the method and system of using a frequent shopper card as a phone calling card include (i) using the transfer phone-time certificate to place a call directly or to add phone time to the frequent shopper card include adding more value/uses to the frequent shopper card by converting it into a pre-paid phone calling card; (ii) transferring of the phone time to the frequent shopper card in real time; providing a method and system with minimal cashier involvement since the cashier simply has to enter price look-up (PLU) keystroke procedures; (iii) providing security features such as printing transfer phone-time certificates only when a register is in live mode; (iv) 24 hour customer service support at the transfer phone-time certificate and/or frequent shopper card server; and (v) turnkey reporting features by using the sales reports on a basis of the transfer phone-time certificate type sold.

Although the preferred embodiment of the invention is described in terms of a user connecting to the transfer phone-time certificate server and/or frequent shopper card server 400 over a voice connection D3, as will be apparent to those skilled in the computer art, other forms of data transmission formats may be used, such as modem, network, coaxial cable, fiber optic, wireless, etc., by modifying the hardware interface 28 of the transfer phone-time certificate server 400 to include appropriate interface logic and/or software functions.

Although the preferred embodiment of the invention is described in terms of using the transfer phone-time certificate to transfer phone time to the frequent shopper card, phone time could be transferred from another card having a PIN, such as a phone calling card, to the frequent shopper card, as will be apparent to those skilled in the computer art.

The present invention includes a computer program product for implementing the processes of the present invention (e.g., as shown in FIGS. 1, 5 and 6). The computer program product may be on a storage medium including instructions and/or data structures which can be used to program the transfer phone-time certificate server and/or frequent shopper card server 400 and the point-of-sale computer 210 (FIGS. 2 and 4) to perform a process of the invention. The storage medium can include, but is not limited to, any type of disk including floppy disks, optical discs, CD-ROMs, and magneto-optical disks; ROMs; RAMs; EPROMs; EEPROMs, magnetic or optical cards; or any type of media suitable for storing electronic instructions (e.g., the hard disk 10, the floppy drive 12, the tape or CD ROM drive 14 with the tape or the CD media 16, the RAM 22, and the ROM 24). In addition, the ROM and RAM devices of the transfer phone-time certificate server and/or frequent shopper card server 400 and the point-of-sale computer 210 are used to implement data structures for storing, for example, PIN account information, PINs, etc. However, as will be readily apparent to those skilled in the art, this invention may also be implemented by the preparation of application-specific integrated circuits or by interconnecting an appropriate network of conventional component circuits.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for using a frequent shopper card as a phone calling card comprising the steps of:
    (a) issuing a transfer certificate with a predetermined phone time and having a first personal identification number, at a terminal; and
    (b) adding the predetermined phone time to an account, associated with the frequent shopper card having a second personal identification number, based on the first personal identification number, at a server.

2. The method of claim 1, wherein the step of issuing a transfer certificate comprises one of the steps of:
    (a-1) issuing the transfer certificate based on a user request, at the terminal; and
    (a-2) issuing the transfer certificate based on promotional activities, at the terminal.

3. The method of claim 1, wherein the step of adding the predetermined phone time to the account comprises the steps of:
    (b-1) a user connecting to the server;
    (b-2) presenting menu options to the user at the server; and
    (b-3) the user responding to the menu options.

4. The method of claim 1, wherein the step of adding the predetermined phone time to the account comprises the steps of:
    (b-1) extracting the predetermined phone time from the transfer certificate based on the first personal identification number, at the server;
    (b-2) determining existing phone time in the account based on the second personal identification number, at the server; and
    (b-3) adding the predetermined phone time to the existing phone time, at the server.

5. The method of claim 3, wherein the step of the user connecting to the server comprises the step of the user connecting to the server via a telephone, and the step of the user responding to the menu options comprises the user responding to the menu options via keystrokes at a keypad of the telephone.

6. A system for using a frequent shopper card as a phone calling card comprising:
    a terminal configured to issue a transfer certificate with a predetermined phone time and having a first personal identification number; and
    a server configured to add the predetermined phone time to an account, associated with the frequent shopper card having a second personal identification number, based on the first personal identification number.

7. The system of claim 6, wherein the terminal is configured to issue the transfer certificate based on one of a user request and promotional activities.

8. The system of claim 6, wherein a user connects to the server, the server is configured to presents menu options to the user, and the user responds to the menu options.

9. The system of claim 6, wherein the server is configured to extract the predetermined phone time from the transfer certificate based on the first personal identification number, configured to determine existing phone time in the account based on the second personal identification number, and configured to add the predetermined phone time to the existing phone time.

10. The system of claim 8, wherein the user connects to the server via a telephone, and the user responds to the menu options via keystrokes at a keypad of the telephone.

11. The system according to claim 6, wherein the server includes a memory containing a data structure for storing information relating to using a frequent shopper card as a phone calling card, the memory comprising:

fields which store the account information associated with the frequent shopper card; and fields which store the first and second personal identification numbers.

12. A computer program product comprising a computer storage medium having a computer program code mechanism embedded in the computer storage medium for causing a computer to allow a frequent shopper card to be used as a phone calling card, the computer program code mechanism comprising:

a first code device configured to issue a transfer certificate with a predetermined phone time and having a first personal identification number, at a terminal; and a second code device configured to add the predetermined phone time to an account, associated with the frequent shopper card having a second personal identification number, based on the first personal identification number, at a server.

13. The computer program product of claim 12, wherein the first code device is further configured to issue the transfer certificate based on one of a user request and promotional activities, at the terminal.

14. The computer program product of claim 12, wherein when a user connects to the server, the second code device is further configured to presents menu options to the user at the server, and the user responds to the menu options.

15. The computer program product of claim 12, wherein the second code device is further configured to extract the predetermined phone time from the transfer certificate based on the first personal identification number, configured to determine existing phone time in the account based on the second personal identification number, and configured to add the predetermined phone time to the existing phone time, at the server.

16. The computer program product of claim 14, wherein the user connects to the server via a telephone, the user responds to the menu options via keystrokes at a keypad of the telephone, and the second code device is further configured to respond to the keystrokes.

* * * * *